(12) United States Patent
Tsujimoto

(10) Patent No.: US 8,783,965 B2
(45) Date of Patent: Jul. 22, 2014

(54) TAPERED ROLLER BEARING

(75) Inventor: Takashi Tsujimoto, Iwata (JP)

(73) Assignee: NTN Corporation, Osaka-fu (JP)

( * ) Notice: Subject to any disclaimer, the term of this patent is extended or adjusted under 35 U.S.C. 154(b) by 1490 days.

(21) Appl. No.: 11/578,327

(22) PCT Filed: Apr. 18, 2005

(86) PCT No.: PCT/JP2005/007379
§ 371 (c)(1),
(2), (4) Date: Aug. 15, 2008

(87) PCT Pub. No.: WO2005/111446
PCT Pub. Date: Nov. 24, 2005

(65) Prior Publication Data
US 2009/0003745 A1    Jan. 1, 2009

(30) Foreign Application Priority Data

| May 13, 2004 | (JP) | 2004-143882 |
| Jul. 5, 2004 | (JP) | 2004-198703 |
| Jul. 5, 2004 | (JP) | 2004-198704 |
| Sep. 3, 2004 | (JP) | 2004-257108 |

(51) Int. Cl.
| *F16C 33/58* | (2006.01) |
| *F16C 33/48* | (2006.01) |
| *F16C 19/00* | (2006.01) |
| *F16C 33/66* | (2006.01) |
| *F16C 33/46* | (2006.01) |
| *F16C 19/36* | (2006.01) |
| *F16H 48/42* | (2012.01) |

(52) U.S. Cl.
CPC ......... *F16C 33/6681* (2013.01); *F16C 2240/34* (2013.01); *F16H 2048/423* (2013.01); *F16C 33/4635* (2013.01); *F16C 33/4605* (2013.01); *F16C 2240/82* (2013.01); *F16C 19/364* (2013.01); *F16C 2240/84* (2013.01); *F16C 2361/61* (2013.01); *F16C 2240/30* (2013.01)
USPC .......................... 384/572; 384/571; 384/470

(58) Field of Classification Search
USPC ......... 384/572, 573, 574, 575, 576, 577, 578, 384/579, 580, 470, 571
See application file for complete search history.

(56) References Cited

U.S. PATENT DOCUMENTS

| 3,989,326 A | 11/1976 | Hörmann et al. |
| 4,232,914 A | 11/1980 | Bowen, III |

(Continued)

FOREIGN PATENT DOCUMENTS

| EP | 1 698 789 A1 | 9/2006 |
| FR | 2086556 | 12/1971 |

(Continued)

OTHER PUBLICATIONS

Japanese Office Action mailed Jun. 11, 2010 in corresponding Japanese Patent Application 2004-198703 w/English translation.

(Continued)

*Primary Examiner* — Alan B Waits
(74) *Attorney, Agent, or Firm* — Wenderoth, Lind & Ponack, L.L.P.

(57) ABSTRACT

A tapered roller bearing is used in transmissions or differentials for automobiles. The tapered roller bearing includes an inner ring, an outer ring, a plurality of tapered rollers rollably disposed between the inner and outer rings, and a cage for holding the tapered rollers at circumferential predetermined intervals. The roller coefficient γ exceeds 0.94, where γ is (the number of rollers×mean roller diameter)/(π×PCD).

7 Claims, 11 Drawing Sheets

(56) References Cited

U.S. PATENT DOCUMENTS

| | | | | |
|---|---|---|---|---|
| 5,039,231 | A * | 8/1991 | Kispert et al. | 384/572 |
| 5,328,277 | A * | 7/1994 | Moulton | 384/572 |
| 6,086,261 | A * | 7/2000 | Nakagawa et al. | 384/571 |
| 6,135,643 | A * | 10/2000 | Hattori et al. | 384/589 |
| 6,406,189 | B1 * | 6/2002 | Boutreux et al. | 384/527 |
| 6,443,625 | B1 * | 9/2002 | Nogi | 384/572 |
| 6,682,224 | B2 * | 1/2004 | Ooitsu et al. | 384/527 |
| 2002/0110298 | A1 * | 8/2002 | Tada | 384/523 |
| 2003/0053727 | A1 * | 3/2003 | Yokota | 384/580 |
| 2004/0047528 | A1 * | 3/2004 | Tsujimoto et al. | 384/571 |
| 2004/0081382 | A1 * | 4/2004 | Yokota | 384/580 |

FOREIGN PATENT DOCUMENTS

| | | |
|---|---|---|
| GB | 724535 | 2/1955 |
| JP | 64-79419 | 3/1989 |
| JP | 3-69823 | 3/1991 |
| JP | 7-269573 | 10/1995 |
| JP | 9-79270 | 3/1997 |
| JP | 10-9257 | 1/1998 |
| JP | 11-210765 | 8/1999 |
| JP | 2000-240661 | 9/2000 |
| JP | 2002-235752 | 8/2002 |
| JP | 2002-276672 | 9/2002 |
| JP | 2003-28165 | 1/2003 |
| JP | 2003-166543 | 6/2003 |
| JP | 2005-98316 | 4/2005 |
| JP | 2005-188738 | 7/2005 |

OTHER PUBLICATIONS

Japanese Office Action mailed Jun. 11, 2010 in corresponding Japanese Patent Application 2004-198704 w/English translation.
Japanese Office Action mailed Jun. 11, 2010 in corresponding Japanese Patent Application 2004-257108 w/English translation.
International Preliminary Report on Patentability and Written Opinion of the International Searching Authority issued Nov. 14, 2006 in International (PCT) Application No. PCT/JP2005/007379.
International Search Report issued Aug. 2, 2005 in International (PCT) Application No. PCT/JP2005/007379.
Machine Translation of JP 2000-240661 having a publication date of Sep. 5, 2000.
Takashi Tsujimoto et al., "High Capacity Tapered Roller Bearings", NTN Technical Review No. 73, 2005, pp. 30-39.

* cited by examiner

Coming into contact [At rest]

[Early stages of operation]

Centering of cage
[In operation]

| Bearing | Roller coefficient | Lifetime | Remarks |
|---|---|---|---|
| Comparative example 1 (conventional article; cage made of iron sheet) | 0.86 | 16.4 hours | Inner ring flaking |
| Embodiment 1 (Cage made of iron sheet) | 0.96 | 40.2 hours | Stopped by increase in torque due to cage wear |
| Embodiment 2 | 0.96 | Not less than 200 hours | No abnormality found, brought to closure |

TAPERED ROLLER BEARING

TECHNICAL FIELD

This invention relates to a tapered roller bearing and particularly it relates to, but is not limited to, a tapered roller bearing used for supporting gears in the transmissions or differentials of automobiles.

BACKGROUND OF THE INVENTION

Automobile transmissions have recently tended to use low viscosity oil so as to attain AT, CVT, low fuel consumption, etc., for the transmission. In an environment where low viscosity oil is used, the surface-start abrasion, which results in a very short bearing life, sometimes occurs in the inner ring raceway surface, where the surface pressure is high, due to poor lubrication when such adverse conditions as (1) high oil temperature, (2) little oil quantity, and (3) pre-load escape, simultaneously happen.

As for measures against this short bearing life due to the surface-start abrasion, a direct and effective solution is to reduce the maximum surface pressure. To reduce the maximum surface pressure, it is necessary to change the bearing size or to increase the number of rollers of the bearing if the bearing size is not to be changed. To increase the number of rollers without decreasing the roller diameter, it is necessary to narrow the distance between pockets in the cage. To this end, however, the pitch circle of the cage has to be increased to draw the cage as close as possible to the outer ring.

As an example in which the cage is drawn to the side until it touches the inner diameter surface of the outer ring, there is a tapered roller bearing shown in FIG. 1 (refer to Japanese Patent Laid-Open No. 2003-28165). In this tapered roller bearing 11, the outer peripheral surfaces of the small and large diameter annular sections 12a and 12b of the cage 12 are placed in slide contact with the inner diameter surface of the outer ring 13 so as to guide the cage 12, and the outer diameter surface of each pillar 12c of the cage 12 is formed with a recess 14 for suppressing drag torque, thereby maintaining the non-contact state between the outer diameter surfaces of the pillars 12c and the raceway surface 13a of the outer ring 13. The cage 12 has a small diameter annular section 12a, a large diameter annular section 12b, and a plurality of pillars 12c which axially connect the small and large diameter annular sections 12a and 12b and which are formed with recesses 14 in the outer peripheral surface thereof. And disposed between successive pillars 12c are a plurality of pockets for rollably receiving tapered rollers 15. The small diameter annular section 12a is provided with a flange 12d integrally extending to the inner diameter side. The tapered roller bearing of FIG. 1 is an example intended to improve the strength of the cage 12, wherein the cage 12 is drawn to the side until it touches the inner diameter surface of the outer ring 13 in order to increase the peripheral width of the pillars 12c of the cage 12.

SUMMARY OF THE INVENTION

In the tapered roller bearing 11 described in Japanese Patent Laid-Open No. 2003-28165, the cage 12 is drawn to the outer diameter side until it touches the inner diameter surface of the outer ring 13 to thereby increase the peripheral width of the pillars 12c of the cage 12. Further, because of the presence of the recesses 14 in the pillars 12c of the cage 12, the plate thickness becomes inevitably thin, leading to a decrease in the rigidity of the cage 12, including the possibility of the cage 12 being deformed by the stresses during assembly of the bearing 11 or the cage 12 being deformed during rotation of the bearing 11. Trying to increase the rigidity of the cage 12 will result in an increase in the diameter dimension of the cage 12, including the possibility of causing an increase in torque due to slide contact in the outer ring contact section, or causing the so-called drag torque.

On the other hand, a conventional typical tapered roller bearing with a cage, excluding the tapered roller bearing described in Japanese Patent Laid-Open No. 2003-28165, is designed so that the roller coefficient γ (roller packaging percentage) defined by the following formula is normally not more than 0.94 in order to secure the pillar width of the cage 17 and to obtain appropriate pillar strength and smooth rotation of the cage 17 after avoidance, as shown in FIG. 2, of contact between the outer ring 16 and the cage 17. In addition, in FIG. 2, the reference character 18 denotes a tapered roller bearing, 19 denotes a pillar surface, 20 denotes an inner ring, and θ denotes a window angle.

Roller coefficient $\gamma = (Z \cdot DA)/(\pi \cdot PCD)$, where Z is the number of rollers, DA is the mean diameter of the rollers, and PCD is the pitch circle diameter.

Trying to simply increase the roller packaging percentage while leaving the pocket size of the cage 17 as it is, will result in the pillars 17a of the cage 17 becoming slender, failing to secure sufficient pillar strength. On the other hand, when the cage diameter is changed (increased) in a direction to decrease the clearance between the cage and the outer ring in order to secure pillar strength, there is a possibility, as introduced in Japanese Patent Laid-Open No. 2003-28165, of promoting wear in the outer ring contact section of the cage and causing an increase in drag torque.

An object of the invention is to provide a tapered roller bearing which is capable of increasing the number of reception without lowering the cage rigidity and which will never produce drag torque.

Another object of the invention is to prevent premature fracture due to an increase in load capacity and excessive surface pressure on the raceway surface, and to contribute to size reduction and longevity of transmissions.

According to an embodiment of the invention, a tapered roller bearing includes an inner ring, an outer ring, a plurality of tapered rollers rollably disposed between the inner and outer rings, and a cage for holding the tapered rollers at circumferential predetermined intervals, wherein the cage, when in its neutral state, is not in contact with the outer ring, but, when radially moved, it comes into contact with the outer ring. Thereby, the maximum surface pressure of the raceway surface of the tapered roller bearing can be lowered, thus enabling the surface-start abrasion, which results in an extremely short bearing life, to be prevented from occurring in a severe lubricating environment.

The tapered roller bearing may allow the roller coefficient γ to exceed 0.94. Setting the roller coefficient γ at γ>0.94 makes it possible not only to increase load capacity but also to lower the maximum surface pressure on the raceway surface; therefore, the surface-start abrasion, which results in an extremely short bearing life, can be prevented from occurring under severe lubricating conditions.

According to another embodiment, a tapered roller bearing includes an inner ring, an outer ring, a plurality of tapered rollers rollably disposed between the inner and outer rings, and a cage for holding the tapered rollers at circumferential predetermined intervals, wherein the roller coefficient γ exceeds 0.94. As described just above, setting the roller coefficient γ of the tapered roller bearing at γ>0.94 makes it possible not only to increase load capacity but also to lower the maximum surface pressure on the raceway surface; therefore, the surface-start abrasion, which results in an extremely short bearing life, can be prevented from occurring under severe lubricating conditions. Therefore, this contributes to size reduction and longevity of transmissions or differentials using the tapered roller bearing.

In the tapered roller bearing, the window angle of the pockets may range from 55° to 80°. The term "window angle" refers to the angle formed by the guide surface of a pillar abutting against the peripheral surface of a single roller. The reason for setting the window angle at not less than 55° is to secure good state of contact with the roller, and the reason for setting it at not more than 80° is that if this value is exceeded, the radial pressing force increases, involving the danger that smooth rotation cannot be obtained even if self-lubricating resin material is used. In addition, usual cages have window angles of 25°-50°.

The cage may be constituted by engineering plastics superior in mechanical strength, oil resistance, and heat resistance. The use of resin material for the cage has a feature that, as compared with a cage made of iron sheet, the cage is light-weight, is self-lubricating, and has a low friction coefficient, which feature, coupled with the effect of the lubricating oil present in the bearing, makes it possible to suppress occurrence of wear due to contact with the outer ring. As compared with steel sheet, these resins are light-weight and have so low a friction coefficient that they are suitable for reducing torque loss and cage wear at the time of starting of the bearing.

Engineering plastics include general purpose engineering plastics and super engineering plastics. Typical ones are shown below but these are by way of example, and the engineering plastics are not limited to what is shown below.

[General purpose engineering plastics]: polycarbonate (PC), polyamide 6 (PA6), polyamide 66 (PA66), polyacetal (POM), modified polyphenylene ether (m-PPE), polybutylene terephthalate (PBT), GF-reinforced polyethylene terephthalate (GF-PET), ultra high molecular weight polyethylene (UHMW-PE).

[Super engineering plastics]: polysulfone (PSF), polyether sulfone (PES), polyphenylene sulfide (PPS), polyarylate (PAR), polyamideimide (PAI), polyetherimide (PEI), Polyether-etherketone (PEEK), liquid crystal polymer (LCP), thermoplastic polyimide (TPI), polybenz-imidazole (PBI), polymethyl pentene (TPX), poly 1,4-cyclohexane dimethylene terephthalate (PCT), polyamide 46 (PA46), polyamide 6T (PA6T), polyamide 9T (PA9T), polyamide 11, 12 (PA11, 12), fluororesin, polyphthalamide (PPA).

These and other objects and features of the invention will become more apparent as the description proceeds with reference to the drawings.

DETAILED DESCRIPTION OF THE INVENTION

Transmissions (main speed change units) for automobiles are classified broadly into the manual type and the automatic type. Further, they can also be classified according to the driving system of the vehicle: a trans-axle for front wheel drive (FWD), a transmission for rear wheel drive (RWD), and a transfer (auxiliary speed changing unit) for four-wheel drive (4WD). They are used to speed-change the drive power from the engine and to transmit it to the drive shaft or the like.

Figure 3:
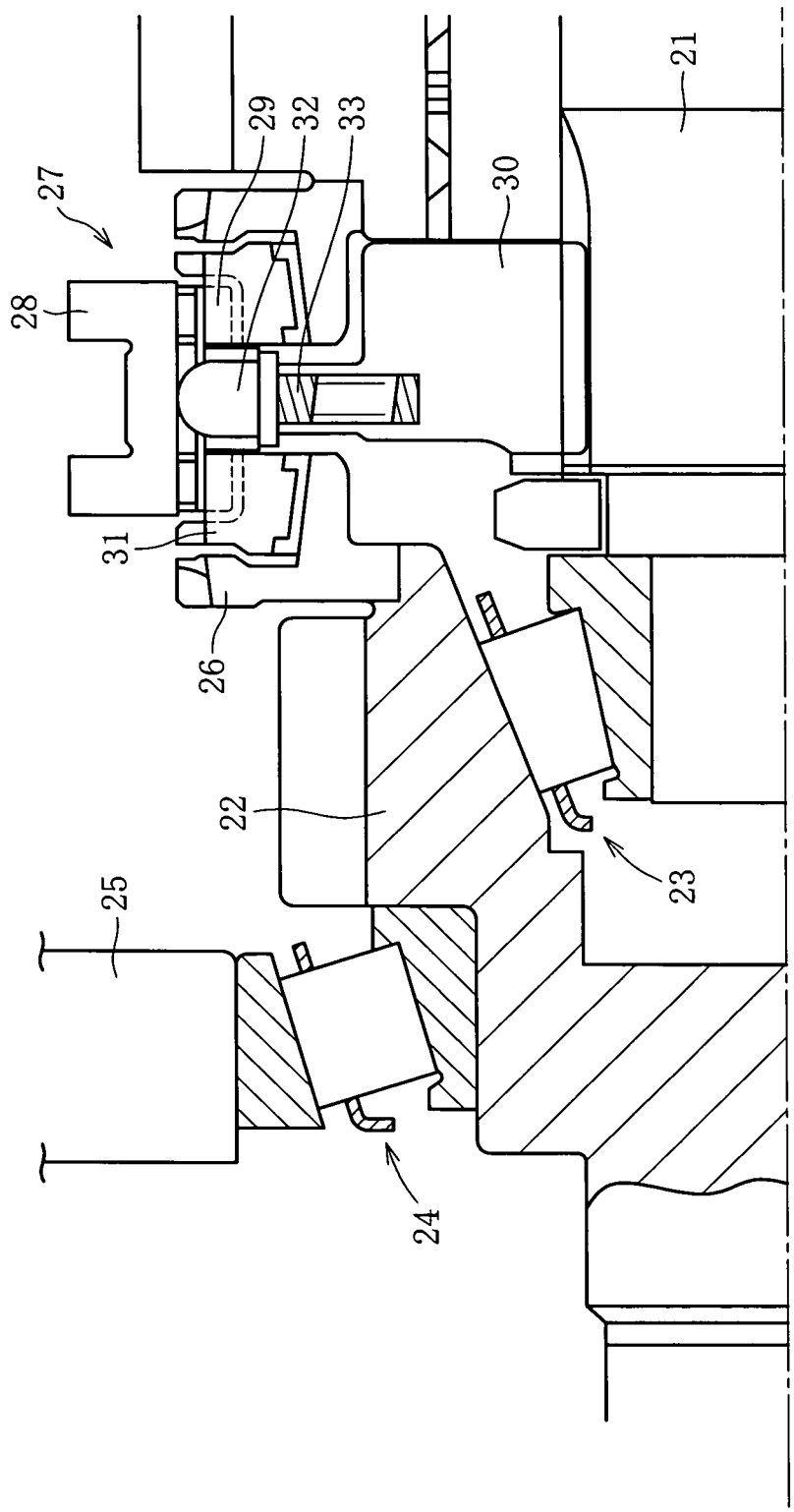
FIG. 3 is a sectional view of a general transmission for automobiles.

FIG. 3 shows an example of the arrangement of the transmission of an automobile. This transmission is of the synchromesh type, in which the left side is the engine side and the right side is the drive wheel side in the same figure. A tapered roller bearing 23 is interposed between a main shaft 21 and a main drive gear 22. In this example, the inner periphery of the main drive gear 22 is directly formed with an outer ring raceway surface for the tapered roller bearing 23. The main drive gear 22 is supported by a tapered roller bearing 24 for rotation relative to a casing 25. A clutch gear 26 is connected by engagement to the main drive gear 22, and a synchro-mechanism 27 is disposed close to the clutch gear 26.

The synchro-mechanism 27 includes a sleeve 28 adapted to be moved axially (in a left-right direction in the same figure) by the action of a selector (not shown), a synchronizer key 29 axially slidably installed in the inner periphery of the sleeve 28, a hub 30 attached to the outer periphery of the main shaft 21, a synchronizer ring 31 slidably installed on the outer periphery (the cone section) of the clutch gear 26, and a hold-down pin 32 and a spring 33 which elastically press the synchronizer key 29 against the inner periphery of the sleeve 28.

In the state shown in the same figure, the sleeve 28 and synchronizer key 29 are held in the neutral position by the hold-down pin 32. At this time, the main drive gear 22 runs idle relative to the main shaft 21. On the other hand, when the selector is actuated to cause the sleeve 28 to move, for example, axially to the left, from the state shown in the same figure, the synchronizer key 29 moves axially to the left following the sleeve 28, so as to press the synchronizer ring 31 against the inclined surface of the cone section of the clutch gear 26. This decreases the rotative speed of the clutch gear 26 and reversely, increases the rotative speed of the synchro-mechanism 27. And, at about the time when the rotative speeds of the two have synchronized, the sleeve 28 further moves axially to the left, meshing with the clutch gear 26, and the main shaft 21 and the main drive gear 22 are connected to each other through the synchro-mechanism 27. This allows the main shaft 21 and the main drive gear 22 to synchronously rotate.

Figure 4:
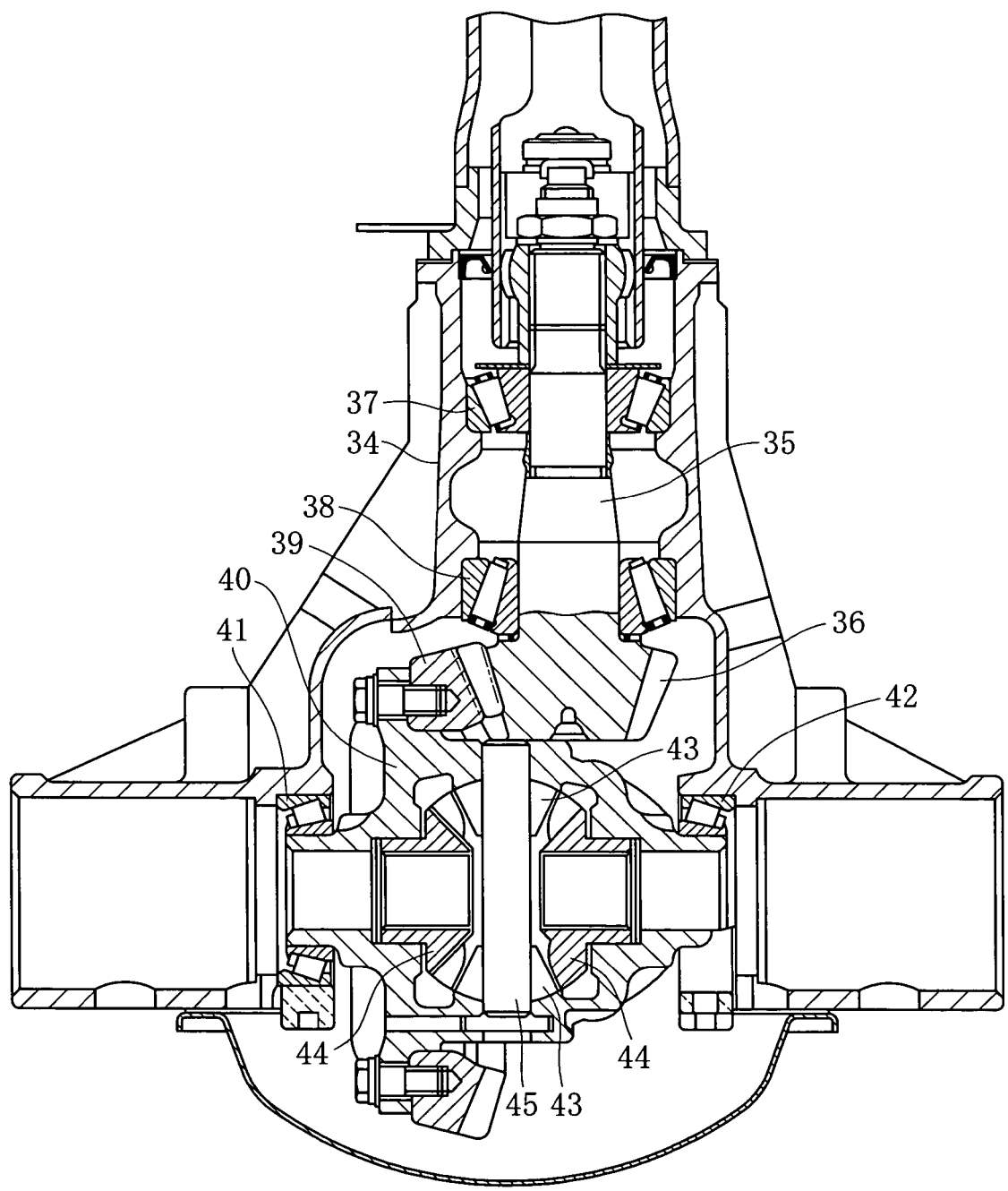
FIG. 4 is a sectional view of a general differential for automobiles.

FIG. 4 shows a general differential for automobiles. In the same figure, the upper and lower sides are the forward and rearward sides of the vehicle, respectively. A drive pinion shaft 35 is received in the front of a differential case 34 and is rotatably supported by a pair of tapered roller bearings 37 and 38. The drive pinion shaft 35 has a propeller shaft (not shown) connected to the front end thereof and a drive pinion gear (speed reduction small gear) 36 fixed to the rear end thereof or integrally provided thereon, which meshes with a link gear (speed reduction large gear) 39.

The link gear 39 is connected to a differential gear case 40, and the differential gear case 40 is supported by a pair of tapered roller bearings 41 and 42 for rotation relative to the differential case 34. Disposed in the differential gear case 40 are a pair of pinion gears 43 and a pair of side gears 44 meshing therewith. The pinion gears 43 are fixed to a pinion shaft 45, and the side gears 44 are mounted in the differential gear case 40 through thrust washers. Unillustrated left and right drive shafts are connected (serration-connected or otherwise) to the inner diameter sections of the side gears 44 corresponding thereto.

The drive torque for the propeller shaft is transmitted by a route: drive pinion gear 36→link gear 39→differential gear case 40→pinion gears 43→side gears 44→drive shaft. On the other hand, the driving resistance for the tire is transmitted by a route: drive shaft→side gears 44→pinion gears 43.

Figure 5:
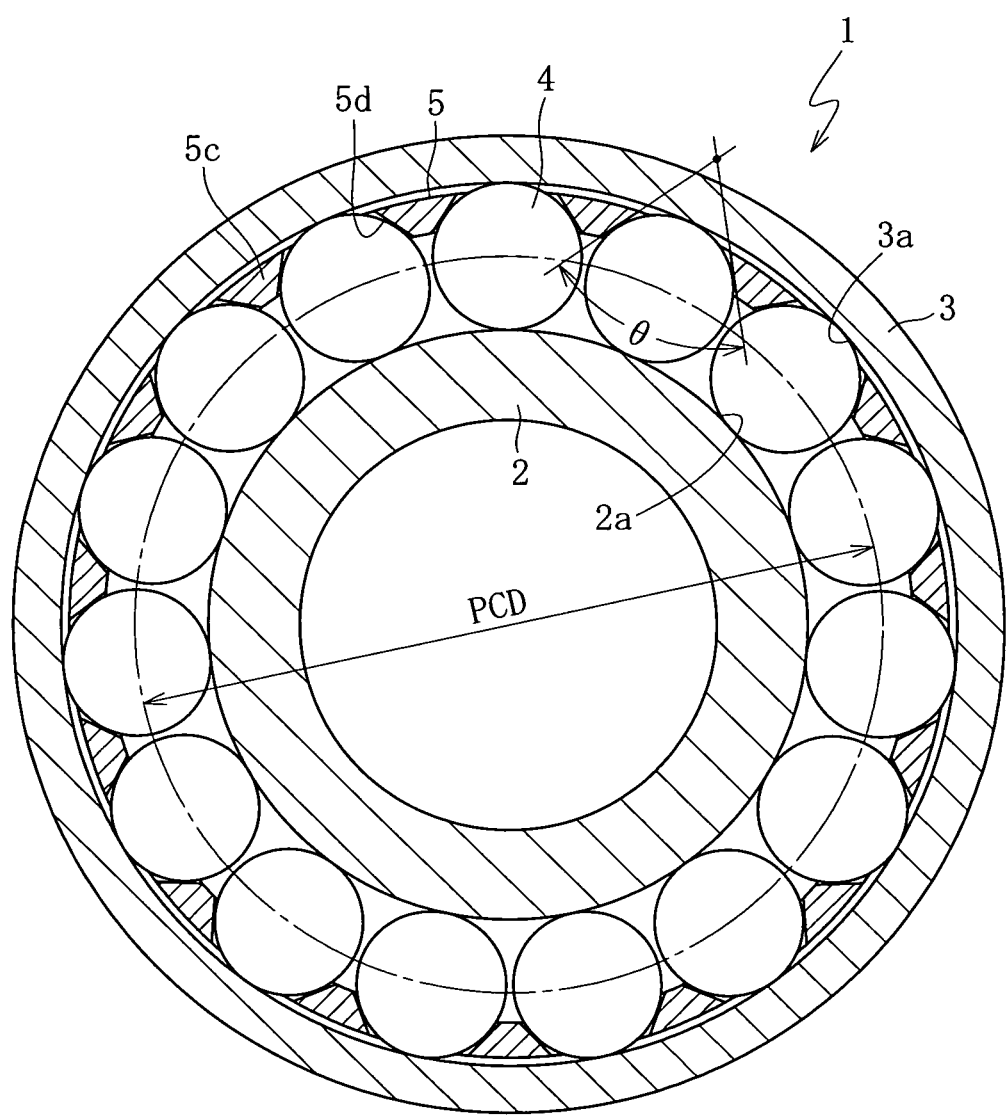
FIG. 5 is a cross sectional view of a tapered roller bearing of the invention.
Figure 6:
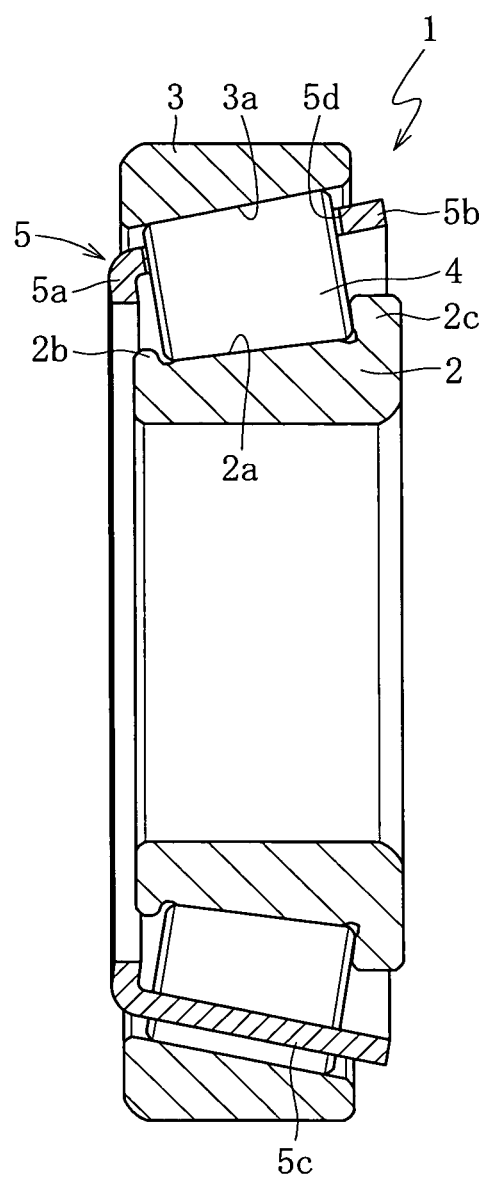
FIG. 6 is a longitudinal sectional view of the tapered roller bearing of FIG. 5.

A tapered roller bearing 1 shown in FIGS. 5 and 6 is used for a transmission or differential for automobiles described above in connection with FIG. 3 or 4. It is composed of an inner ring 2 having a tapered raceway surface 2a which has a cone front face rib 2b on its small diameter side and a cone back face rib 2c on its large diameter side, an outer ring 3 having a tapered raceway surface 3a, a plurality of tapered rollers 4 rollably interposed between the raceway surfaces 2a and 3a of the inner and outer rings 2 and 3, and a cage 5 for holding the tapered rollers 4 at circumferential equal intervals. This tapered roller bearing 1 has a roller coefficient $\gamma > 0.94$.

The cage 5 includes a small diameter side annular section 5a, a large diameter side annular section 5b, and a plurality of pillars 5c for axially connecting the small and large diameter side annular sections 5a and 5b. The cage 5 may be made of iron sheet, in which case it can be used without concern for material quality deterioration (oil resistance) due to immersion in oil. The cage 5 may be integrally molded from super engineering plastics, such as PPS, PEEK, PA, PPA, or PAI. In addition, in the case of an iron sheet cage, bottom widening or crimping is needed, but in the case of resin cage, it is not needed, making it easy to secure dimensional accuracy. Here, "bottom widening" means an operation in which the diameter of the pillars on the small diameter side of the cage 5 is widened large to enable the rollers to clime over the cone front face rib when the cage 5 having the rollers incorporated therein is assembled to the inner ring. "Crimping" means an operation in which the pillars on the small diameter side of the cage 5 which have been widened large as described above are pressed from outside for restoration of its shape by a form.

Figure 7:
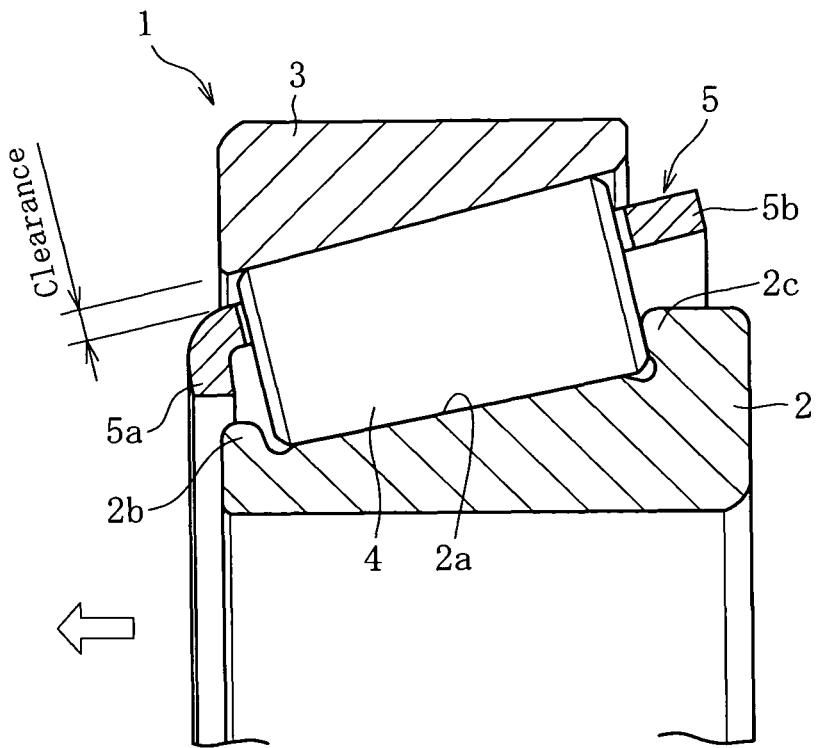
FIG. 7 is a sectional view of a cage before being axially moved.
Figure 8:
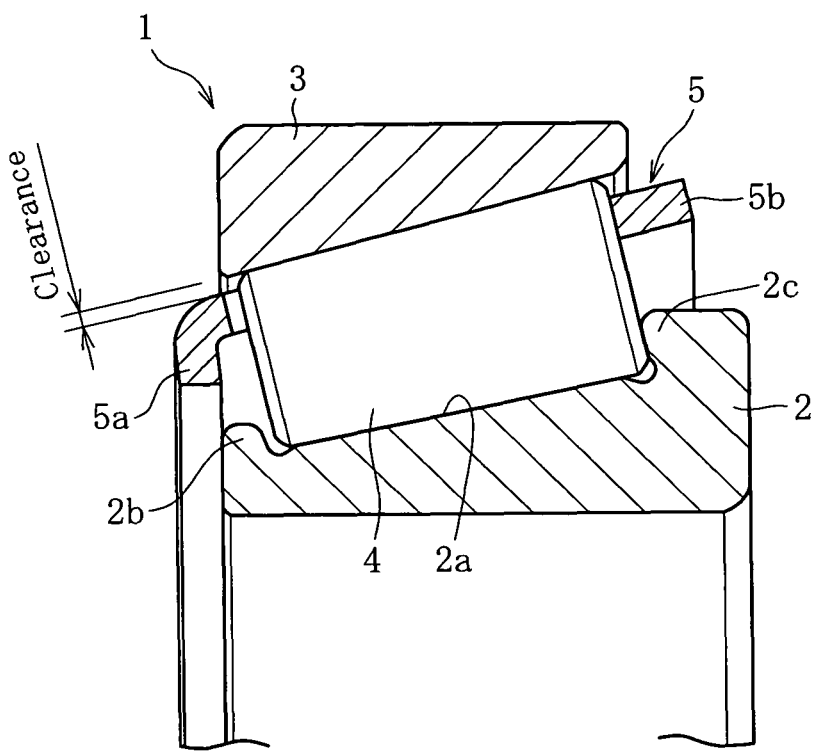
FIG. 8 is a sectional view of the cage after being axially moved.
Figure 9:
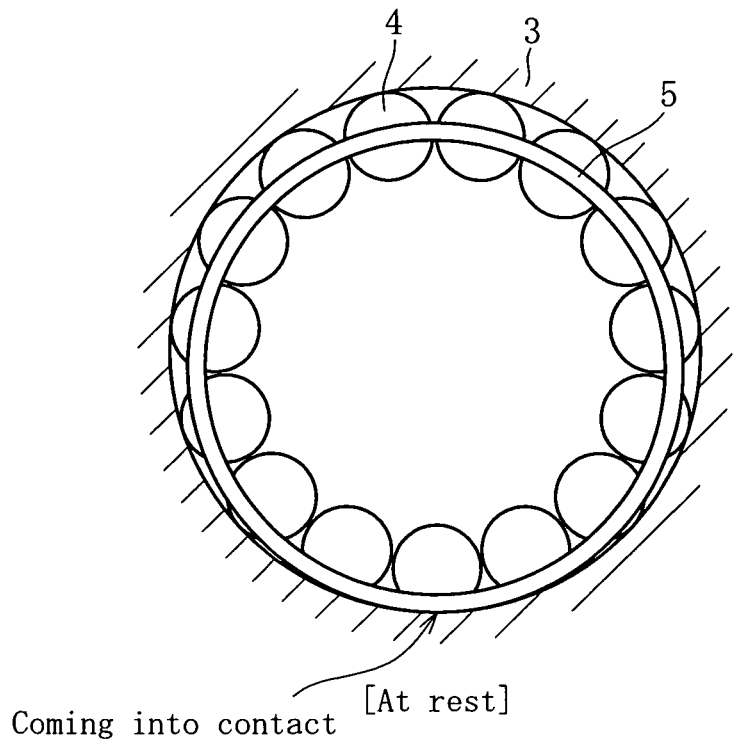
FIG. 9 is a side view of the cage of a tapered roller bearing at rest.
Figure 10:
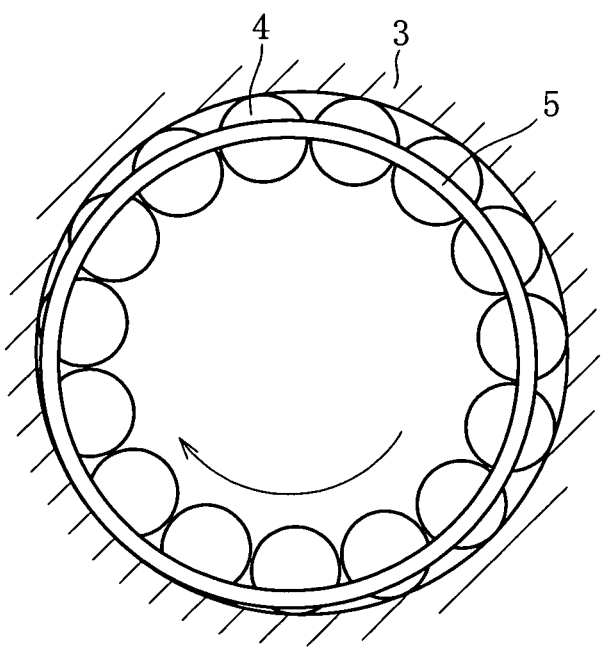
FIG. 10 is a side view of the cage of a tapered roller bearing in early stages of rotation.
Figure 11:
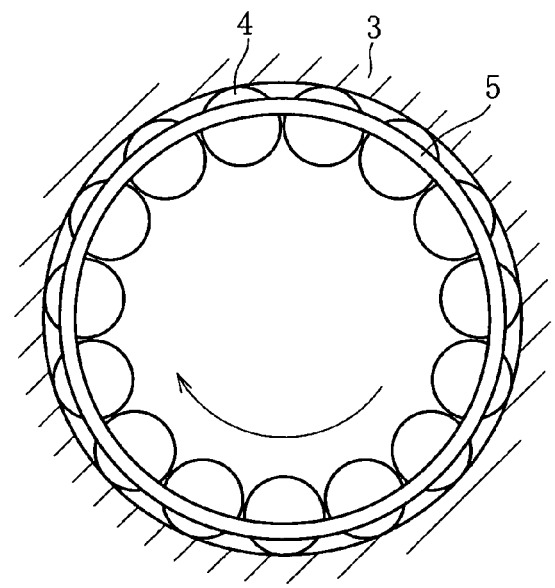
FIG. 11 is a side view of the cage of a tapered roller bearing during rotation.

The outer diameter of the cage 5 is set at such a size that when the cage 5 is axially moved to the small diameter side (FIG. 8) from the state shown in FIG. 7, as indicated by the arrow in the same figure and is then moved radially downward as shown in FIG. 9, the outer ring 3 and the cage 5 contact each other to cause the bearing to rotate to effect the centering of the cage 5, as shown in FIG. 11, whereupon the cage 5 and the outer ring 3 come out of contact, leaving a predetermined clearance throughout the circumference. In other words, such size is a size which ensures that in a state in which the cage 5 is axially centrally disposed and drawn to the small diameter side as shown in FIG. 8, there is a clearance between the cage 5 and the outer ring 3, whereas when the cage 5 is radially moved form the axial center, the outer ring 3 and the cage 5 come into contact. Thereby, the outer ring 3 and the cage 5 come into contact in early stages of operation (FIG. 10) but they are out of contact during operation (FIG. 11); therefore, drag torque, torque increase, or wear, due to contact can be suppressed.

Figure 1:
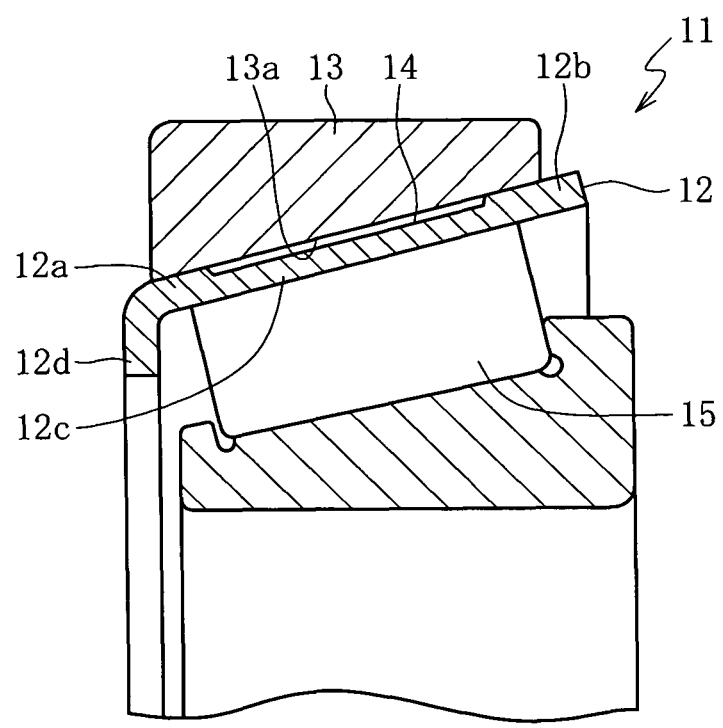
FIG. 1 is a sectional view of a conventional tapered roller bearing with the cage drawn to the outer ring side.
Figure 2:
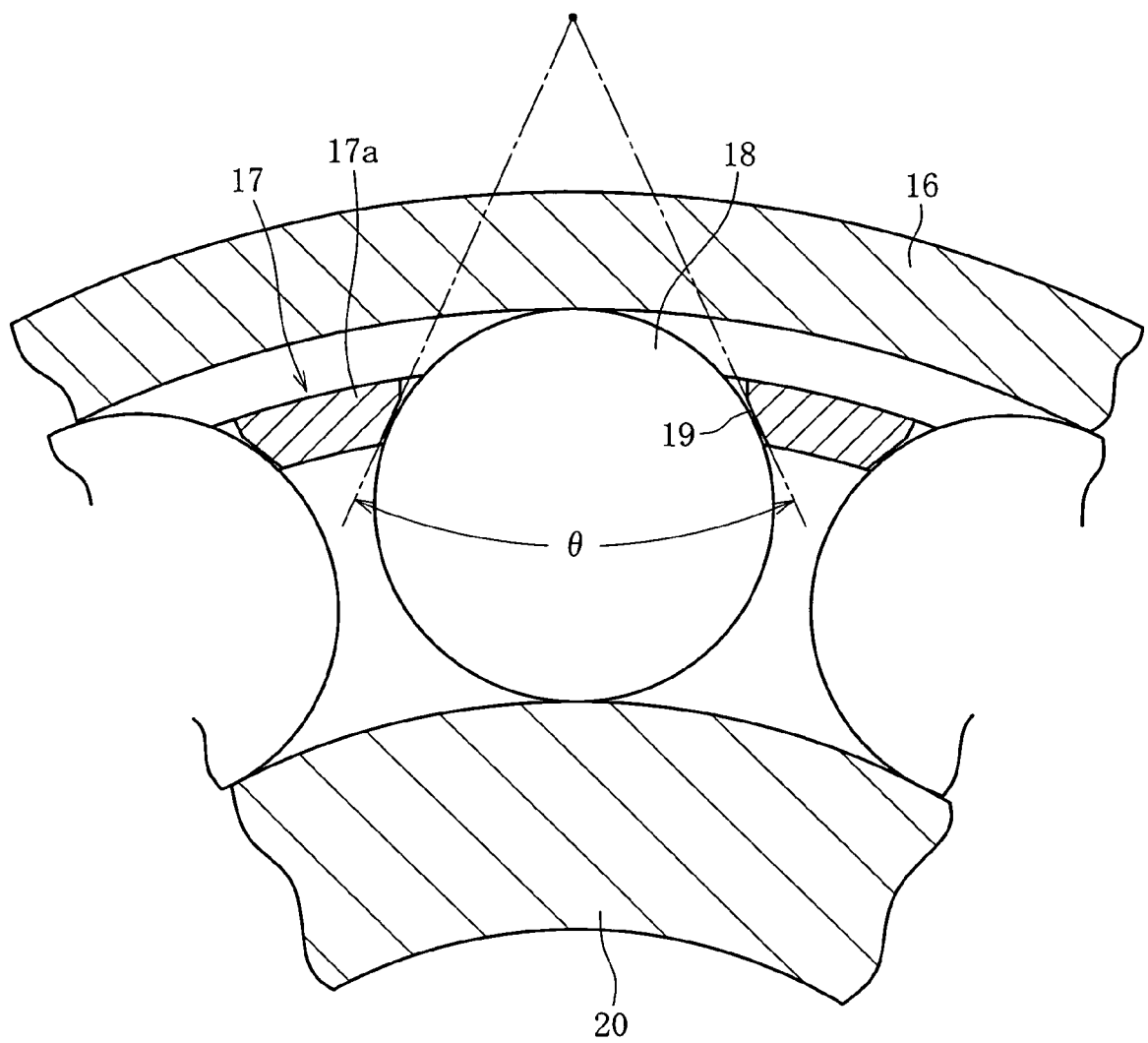
FIG. 2 is a partial enlarged sectional view of another conventional tapered roller bearing.
Figure 12:
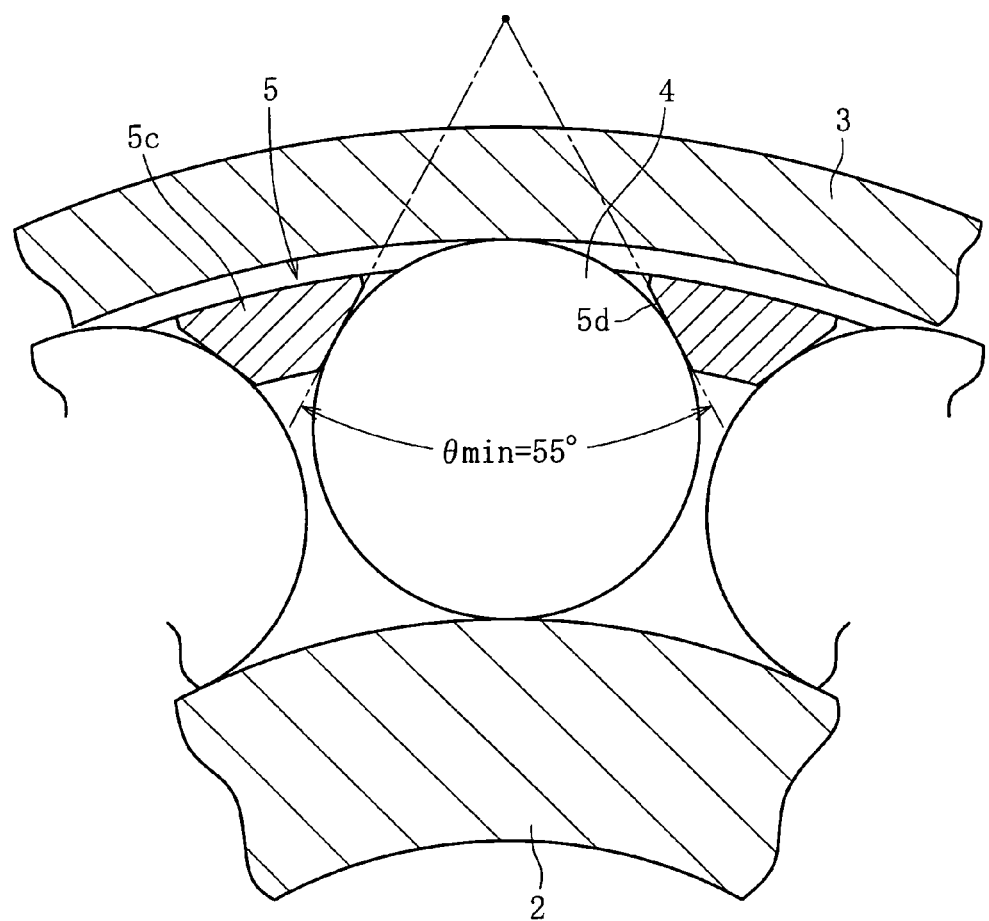
FIG. 12 is a partial enlarged sectional view of a tapered roller bearing with the window angle at its lower limit.
Figures 13, 14:
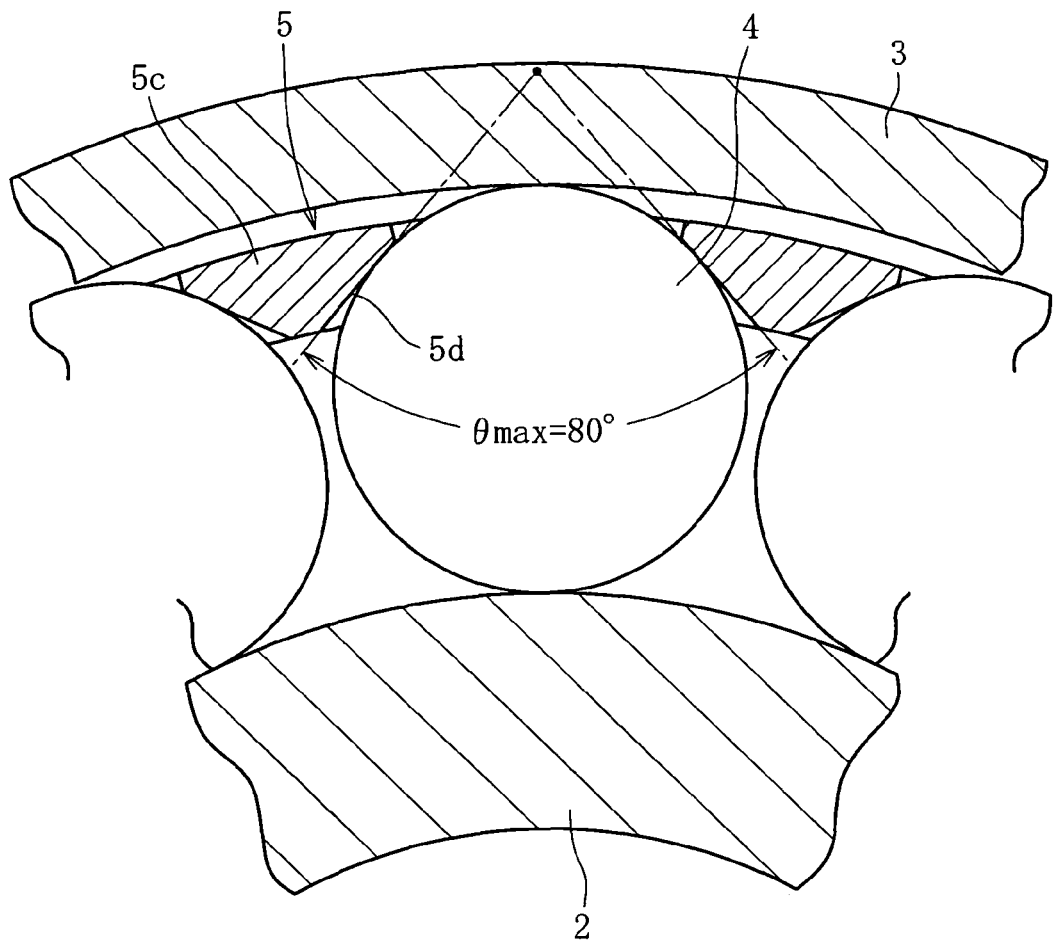
FIG. 13 is a partial enlarged sectional view of a tapered roller bearing with the window angle at its upper limit.
FIG. 14 shows the results of life tests of bearings.

The window angle θ of the pillar surface 5d of the cage 5 has a lower limit window angle θmin which is 55° as shown in FIG. 12 and an upper limit window angle θmax which is 80° as shown in FIG. 13. The window angle θ is at most about 50° for a typical cage-equipped tapered roller bearing whose cage is spaced from the outer ring, as shown in FIG. 2. The reason for setting the lower limit window angle θmin at 55° is to secure a good contact state; the window angle of less than 55° worsens the contact state. That is, setting the window angle at 55° or above ensures that $\gamma > 0.94$ after securement of cage strength and that good contact condition is established. Further, the reason for setting the upper limit window angle θmax at 80° is that if this value is exceeded, the radial pressing force increases, involving the danger that smooth rotation cannot be obtained even if self-lubricating resin material is used.

FIG. 14 shows the results of life test of bearings. In FIG. 14, [Comparative example 1] in the [bearing] column refers to a typical conventional tapered roller bearing in which the cage and the outer ring are spaced, [Embodiment 1] refers to one of the tapered roller bearings according to an embodiment of the invention, in which only the roller coefficient γ is set at $\gamma > 0.94$ with respect to the conventional articles, and [Embodiment 2] refers to a tapered roller bearing according to an embodiment of the invention in which γ is set at $\gamma > 0.94$ and the window angle is set in the range of 55°-80°. The tests were conducted under severe lubrication and excessive load conditions. As is clear from the same figure, [Embodiment 1] has a life twice or more as long as that of [Comparative example]. Further, the bearing in [Embodiment 2] has a roller coefficient of 0.96, which is the same as in [Embodiment 1], but its lifetime is about 5 times or more as long as in [Embodiment 1]. In addition, in [Comparative example 1], [Embodiment 1], and [Embodiment 2], the size is φ45×φ81×16 (in mm), the number of rollers is 24 ([Comparative example]), 27 ([Embodiments 1 and 2]), and the oil film parameter Λ=0.2.

Next, a modification of the invention will be described with reference to FIGS. 15 and 16. A tapered roller bearing 1 shown in the same figures is such that the outer diameter surface of the pillars 5c of a cage 5 integrally molded from engineering plastics is formed with projections 5f convexed toward the outer ring raceway surface side. The rest of the arrangement is the same as the cage 5 (FIG. 6) described above. In the projection 5f, the cross sectional contour in the transverse direction of the pillar 5c is arcuate, as shown in FIG. 16. The radius of curvature $R_2$ of this arcuate shape is smaller than the outer ring raceway surface radius $R_1$. This is for the purpose of ensuring that a good wedge-like oil film is formed between the projection 5f and the outer ring raceway surface, and desirably, the radius of curvature $R_2$ of the projection is about 70-90% of the outer ring raceway surface radius $R_1$. If it is less than 70%, the inlet opening angle of the wedge-like oil film becomes excessively large only to lower the hydrodynamic pressure. Further, if it exceeds 90%, the inlet opening angle of the wedge-like oil film becomes excessively small to likewise lower the hydrodynamic pressure.

Further, the breadth $W_2$ of the projections 5f is desirably 50% or more of the breadth $W_1$ of the pillars 5c ($W_2 \geq 0.5 \times$ $W_1$). This is because if it is less than 50%, it is impossible for the projections $5f$ to secure a sufficient height to form a good wedge-like oil film. In addition, since the outer ring raceway surface radius $R_1$ continuously changes from the large diameter side to the small diameter side, the radius of curvature $R_2$ of the projections $5f$ continuously changes, in harmony with this, from the large radius of curvature $R_2$ of the large diameter side annular section $5b$ to the small radius of curvature $R_2$ of the small diameter side annular section $5a$ (see FIG. 6).

Figure 15:
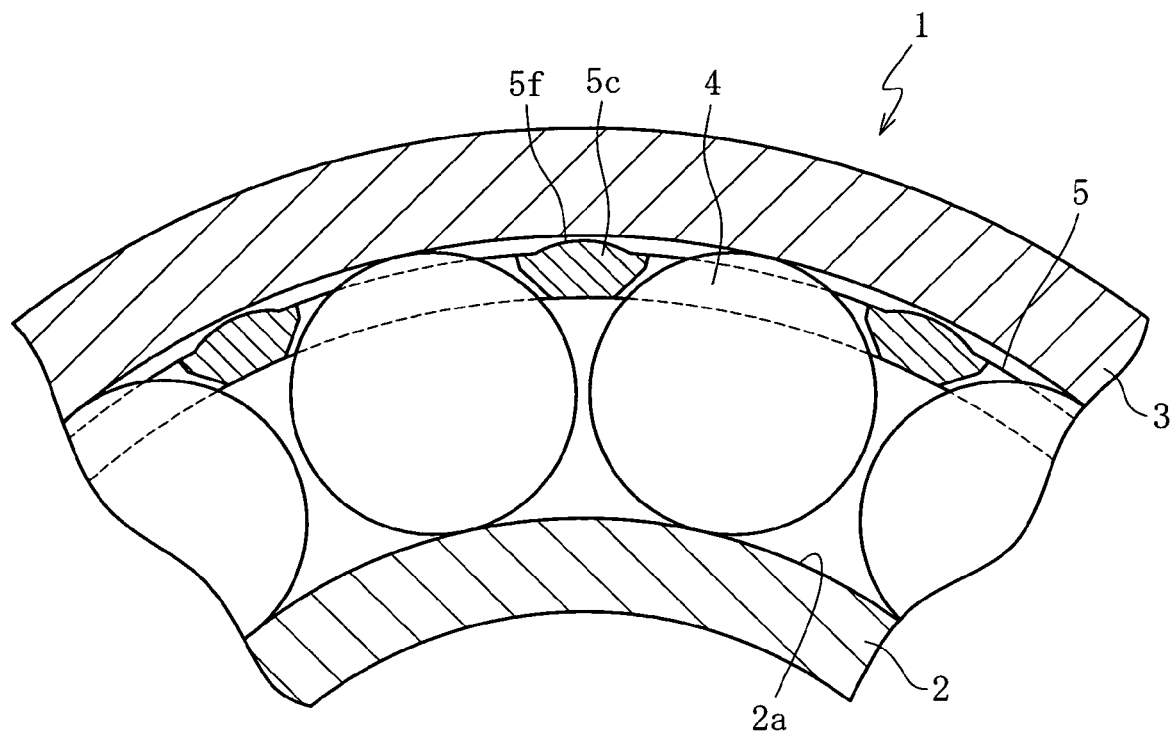
FIG. 15 is a partial sectional view of a tapered roller bearing according to a modification of the invention.
Figure 16:
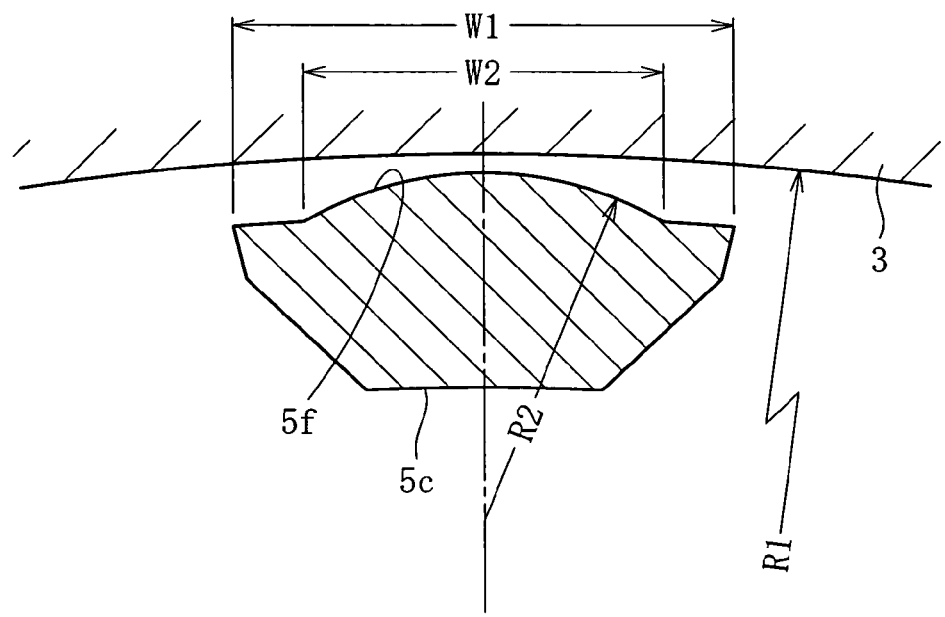
FIG. 16 is a sectional view of pillars of the cage of FIG. 15.

The tapered roller bearing 1 in FIGS. 15 and 16 is constructed in the manner described above; therefore, when the bearing 1 starts to rotate and so does the cage 5, a wedge-like oil film is formed between the outer ring raceway surface and the projections $5f$ of the cage 5. This wedge-like oil film produces a hydrodynamic pressure approximately in proportion with the rotative speed of the bearing 1; therefore, even if the pitch circle diameter (PCD) of the cage 5 is made larger than in the prior art to be close to the outer ring raceway surface, it becomes possible for the bearing 1 to rotate without causing large wear or torque loss, thus enabling the number of rollers to be increased without difficulty.

Embodiments of the invention have so far been described; however, the invention is not limited thereto and various modifications are possible. For example, whereas super engineering plastics, such as PPS, PEEK, PA, PPA, and PAI have been used as the cage material, these resin materials or other engineering plastics having glass fiber or carbon fiber added thereto may be used for strength augmentation purposes as the need arises.

What is claimed is:

1. A tapered roller bearing comprising:
   an inner ring;
   an outer ring;
   a plurality of tapered rollers rollably disposed radially between said inner and outer rings; and
   a cage having a small diameter side, a large diameter side and a plurality of pockets for holding said tapered rollers at circumferential predetermined intervals, wherein
   each of said pockets has a small diameter side end wall located at said small diameter side of said cage and a large diameter side end wall located at said large diameter side of said cage,
   each of said tapered rollers has a small diameter end facing said small diameter side end wall of a respective one of said pockets and a large diameter end facing said large diameter side end wall of said respective one of said pockets,
   a distance between said large and small diameter side end walls of said pockets is greater than a distance between said large and small diameter ends of said tapered rollers to form a clearance therebetween,
   when said cage is positioned such that a portion of the clearance exists between said large diameter side end walls of said pockets and said large diameter ends of said tapered rollers and another portion of the clearance exists between said small diameter side end walls of said pockets and said small diameter ends of said tapered rollers, said cage is movable radially from a central axis of said outer ring without contacting said outer ring,
   when said cage is positioned such that all of the clearance exists between said small diameter side end walls of said pockets and said small diameter ends of said tapered rollers and none of the clearance exists between said large diameter side end walls of said pockets and said large diameter ends of said tapered rollers, said cage is movable radially from the central axis of said outer ring to come into contact with said outer ring,
   the tapered roller bearing has a roller coefficient that exceeds 0.94, and
   the roller coefficient=$(Z \cdot DA)/(\pi \cdot PCD)$, where
   Z is a number of said tapered rollers,
   DA is a mean diameter of said tapered rollers, and
   PCD is a pitch circle diameter of said tapered rollers.

2. A tapered roller bearing as set forth in claim 1, wherein a window angle of said pockets of said cage ranges from 55° to 80°.

3. A tapered roller bearing as set forth in claim 1, wherein said cage is made of an engineering plastic.

4. A tapered roller bearing as set forth in claim 1, wherein the tapered roller bearing is used for transmissions.

5. A tapered roller bearing as set forth in claim 1, wherein the tapered roller bearing is used for differentials.

6. A tapered roller bearing as set forth in claim 2, wherein said cage is made of an engineering plastic.

7. A tapered roller bearing as set forth in claim 2, wherein the tapered roller bearing is used for transmissions.

* * * * *